United States Patent
Oechsle et al.

(10) Patent No.: US 7,204,228 B2
(45) Date of Patent: Apr. 17, 2007

(54) METHOD OF OPERATING AN INTERNAL COMBUSTION ENGINE WITH DIRECT FUEL INJECTION

(75) Inventors: Michael Oechsle, Sindelfingen (DE); Christopf Lux, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/541,878

(22) Filed: Oct. 2, 2006

(65) Prior Publication Data

US 2007/0023003 A1 Feb. 1, 2007

Related U.S. Application Data

(63) Continuation-in-part of application No. PCT/EP05/03414, filed on Apr. 1, 2005.

(30) Foreign Application Priority Data

Apr. 14, 2004 (DE) ............... 10 2004 017 989

(51) Int. Cl.
  *F02B 3/10* (2006.01)
  *F02B 17/00* (2006.01)
(52) U.S. Cl. .................... 123/299; 123/295
(58) Field of Classification Search ........... 123/299, 123/300
  See application file for complete search history.

(56) References Cited

U.S. PATENT DOCUMENTS

| | | | | |
|---|---|---|---|---|
| 6,659,073 | B1 * | 12/2003 | Franke et al. | 123/299 |
| 7,051,701 | B2 * | 5/2006 | Tomita | 123/299 |
| 7,073,479 | B2 * | 7/2006 | Kohler et al. | 123/295 |
| 2004/0040534 | A1 * | 3/2004 | Herden | 123/299 |

FOREIGN PATENT DOCUMENTS

| | | |
|---|---|---|
| DE | 101 49 236 | 4/2003 |
| DE | 102 42 226 | 3/2004 |
| FR | 2 717 227 | 9/1995 |

* cited by examiner

*Primary Examiner*—Erick Solis
(74) *Attorney, Agent, or Firm*—Klaus J. Bach

(57) ABSTRACT

In a method of operating a spark ignition internal combustion engine with direct fuel injection wherein combustion air is supplied to a combustion chamber, fuel is injected into the combustion air during an intake stroke via a fuel injector in a pilot injection using a first fuel quantity so as to from a homogeneous lean air/fuel mixture in substantially the entire combustion chamber, in a main injection subsequently a second fuel quantity is injected in multiple injection steps just before ignition time so as to form a stratified rich air/fuel mixture in the area of a spark plug and the stratified fuel charge is then ignited 2° CA to 10° CA after completion of the injection of the main stratified injection.

7 Claims, 3 Drawing Sheets

METHOD OF OPERATING AN INTERNAL COMBUSTION ENGINE WITH DIRECT FUEL INJECTION

This is a continuation-in-part application of pending international application PCT/EP2005/003414 filed Apr. 1, 2005 and claiming the priority of German patent application 10 2004 017 989.1 filed Apr. 14, 2004.

BACKGROUND OF THE INVENTION

The invention relates to a method of operating a spark-ignition internal combustion engine, in particular a spark-ignition internal combustion engine with direct fuel injection wherein, in an initial fuel injection event, fuel is injected into the intake air to form in a cylinder a lean charge mixture and, in a main fuel injection event, a stratified rich mixture is established in the vicinity of the spark plug and is ignited by the spark plug.

In gasoline engines with intake pipe injection and in direct-injection gasoline engines operated in a homogeneous operating mode, a reduction in fuel consumption can be obtained by means of internal residual exhaust gas retention or external recirculation of combustion gases. Said reduction is based on so-called dethrottling. This means the reduction of the charge exchange work by means of an increase in the intake pipe pressure. The increase in the intake pipe pressure occurs since the renewed intake of residual exhaust gas increases the overall charge, and therefore a larger gas quantity must pass into the combustion chamber during the intake stroke. The larger the re-circulated residual exhaust gas quantity, the higher is the overall charge in the combustion chamber and also, therefore, the higher the required intake pipe pressure. However, the possible exhaust gas recirculation rate is limited by the combustion stability deteriorating with an increasing exhaust gas content in the combustion gas.

A further advantage of exhaust gas recirculation or retention is the reduction of the combustion temperature as a result of the presence of inert gas during combustion. The inert gas is heated by the hot combustion gas during combustion and correspondingly deprives the combustion gas of energy. The reduced combustion chamber temperature considerably reduces the formation of nitrogen oxides, since the formation of nitrogen oxides is primarily dependent on the temperature. High temperatures and the presence of oxygen promote the formation of nitrogen oxides.

Operating a gasoline engine with a lean charge mixture likewise permits a reduction in fuel consumption. The charge quantity and therefore the intake pipe pressure are also increased as a result of the greater mass of combustion air which is taken in, which, in this case however, comprises only fresh air. The moment generated during combustion is predefined by the injected fuel quantity reduced by the relatively low combustion efficiency of lean combustion.

The formation of nitrogen oxides is promoted by the presence of excess oxygen during combustion. Those nitrogen oxides cannot be reduced to nitrogen and oxygen by a 3-way catalytic converter as a result of the presence of oxygen in the combustion gas, and must be eliminated by means of a $NO_x$ storage catalytic converter or similar expensive exhaust gas purification techniques. For this reason, the formation of nitrogen oxides must be minimized during combustion, this being achieved primarily by reducing the combustion chamber temperature. The combustion chamber temperature decreases with an increasing excess of air; a lean operating mode must therefore be implemented with the highest possible excess of air.

It is therefore an object of the present invention to provide a method of operating an internal combustion engine, which method stabilizes the combustion in the combustion chamber and reduces nitrogen oxide emissions even at high residual or re-circulated exhaust gas rates or with a very lean charge mixture.

SUMMARY OF THE INVENTION

In a method of operating a spark ignition internal combustion engine with direct fuel injection wherein combustion air is supplied to a combustion chamber, fuel is injected into the combustion air during an intake stroke via a fuel injector in a pilot injection using a first fuel quantity so as to from a homogeneous lean air/fuel mixture in substantially the entire combustion chamber, in a main injection subsequently a second fuel quantity is injected in multiple injection steps just before ignition time so as to form a stratified rich air/fuel mixture in the area of a spark plug and the stratified fuel charge is then ignited 2° CA to 10° CA after completion of the injection of the main stratified injection.

In the method according to the invention, the fuel quantity which is injected into the combustion chamber is divided into two injection quantities. The pilot injection takes place during the intake stroke of the internal combustion engine in order to form a homogeneous, lean air/fuel mixture in the entire combustion chamber. The main injection into the combustion chamber during the compression stroke of the internal combustion engine forms a stratified, rich air/fuel mixture charge cloud in the region of the spark plug directly before the ignition time, so that reliable combustion of said charge cloud is permitted even at very late ignition times. In addition, the stratified main injection generates intensified turbulence at high pressure in the region of the spark plug. The homogeneous, lean pilot injection provides a relatively high excess of air, which brings about a reduction in nitrogen oxide emissions, and the stratified, rich main injection improves the combustion stability in order to ensure the same degree of running smoothness of the internal combustion engine. This optimizes the advantage of the fuel saving obtained by operating the internal combustion engine at high residual exhaust gas rates or with very lean charge mixtures.

In a preferred embodiment of the invention, the main injection is carried out as a multiple injection with a plurality of stratified injections in rapid succession. Said multiple injection improves the mixture of the fuel, which is injected in a stratified fashion, with the fresh air and the residual exhaust gas, increases the degree of turbulence in the region of the spark plug and therefore further stabilizes the combustion.

In one embodiment of the invention, the main injection is carried out as a double injection with two stratified injections. In this case, the ignition time can occur after the second stratified injection of the main injection or between the first and second stratified injections of the main injection event.

In an alternative embodiment of the invention, the main injection is carried out as a triple injection with three stratified injections. In this case, the ignition time can occur after the third stratified injection of the main injection or optionally between the first and second, or between the second and third, stratified injections of the main injection.

In a further embodiment of the invention, in the case of operation with high residual exhaust gas rates, the pilot injection generates a slightly lean air/fuel mixture, in particular an air/fuel mixture of $\lambda \approx 1.3$, in the combustion chamber. During lean operation of the internal combustion engine, a preferably considerably leaner charge mixture is generated as a function of the maximum obtainable excess of air.

In the case of operation of the internal combustion engine at high residual exhaust gas rates, the air/fuel mixture, after the second stratified injection, averaged across the entire combustion chamber, is preferably to be stoichiometric ($\lambda=1$), however, in the case of homogeneous lean operation of the internal combustion engine, said air/fuel mixture is preferably lean.

The ignition timing corresponds to the normal ignition time in a conventional homogeneous operating mode of the internal combustion engine, that is to say it occurs, depending on the operating mode of the internal combustion engine, between 0° CA and 35° CA before ignition top dead center.

In a further embodiment of the invention, the end of the main injection and/or of the first stratified injection of the main injection occurs at approximately 2° CA to 10° CA before the ignition time.

In a further preferred embodiment of the invention, the pilot injection is also carried out as a multiple injection with a plurality of homogeneous injections. This measure further improves the homogeneity of the air/fuel mixture in the entire combustion chamber.

Further features and feature combinations are apparent from the description. Exemplary embodiments of the invention are illustrated in simplified form and described below in more detail on the basis of the accompanying drawings:

DESCRIPTION OF PREFERRED EMBODIMENTS OF THE INVENTION

Figure 1:
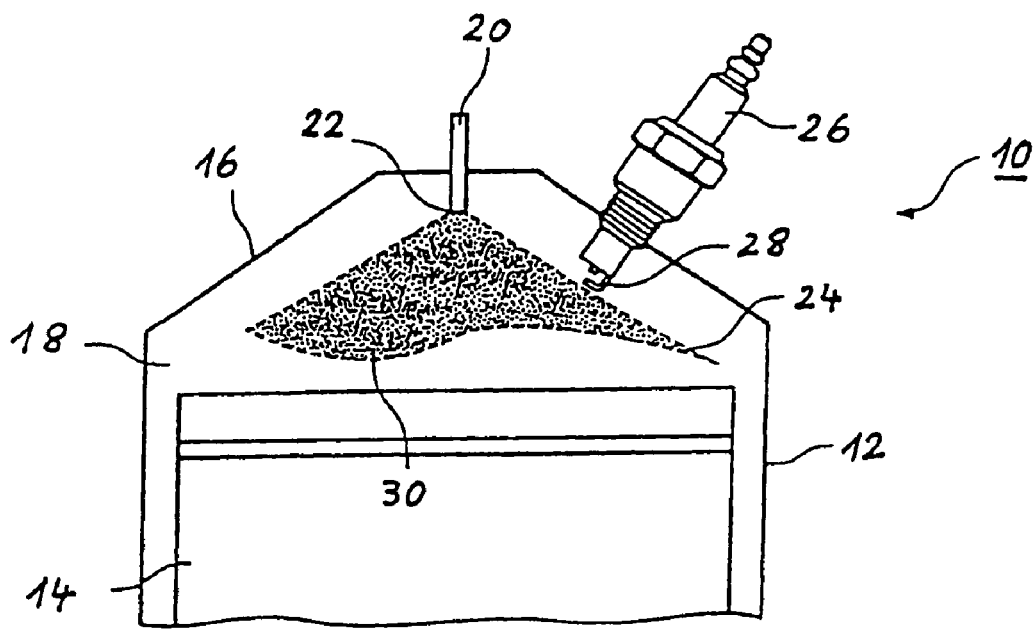
FIG. 1 is a schematic cross-sectional illustration a cylinder of a spark-ignition internal combustion engine with direct fuel injection wherein the method according to the present invention can be used.

FIG. 1 shows in a considerably simplified view a cylinder 12 of a spark ignition internal combustion engine 10 with direct fuel injection. In the cylinder 12, a combustion chamber 18 is delimited by a piston 14 and a cylinder head 16 which closes off the cylinder 12. A fuel injector 20, which can inject fuel into the combustion chamber 18 through a nozzle opening 22, is arranged centrally in the cylinder head 16. During a start phase of the internal combustion engine 10, a control device (not illustrated) determines, inter alia, the injection times of the fuel, with the associated fuel quantities, and an ignition time point at which an air/fuel mixture, which is formed in the combustion chamber, is ignited by means of a spark plug 26 or the like.

When the nozzle opening 22 of the fuel injector 20 is unblocked, the fuel is injected into the combustion chamber 18 in the form of a conical jet 24 with an opening angle of between 70° and 110°. The spark plug 26 is positioned in the combustion chamber 18 such that the electrodes 28 of the spark plug 26 are not wetted by the injected fuel cone 24.

The internal combustion engine 10 illustrated in FIG. 1 preferably operates on the four-stroke cycle. In a first stroke of a working cycle of the internal combustion engine 10, the so-called intake stroke, the combustion chamber 18 is supplied with combustion air through an inlet duct (not illustrated). Here, the piston 14 moves downward to a bottom dead center BDC. In a subsequent compression stroke of the internal combustion engine 10, the piston 14 moves upward from bottom dead center BDC to an ignition top dead center ITDC position. In a subsequent expansion stroke, the piston 14 moves downward again to bottom dead center BDC, and in a fourth exhaust stroke, the piston 14 travels upward to a top dead center TDC position in order to thus discharge the exhaust gases from the combustion chamber 18.

It is an aim of the method according to the invention to provide an injection strategy for an internal combustion engine which permits external recirculation or internal retention of large residual exhaust gas rates, or operation with a very lean charge mixture, in order to obtain the greatest possible fuel saving. This should simultaneously stabilize the combustion, maintain the running smoothness and reduce the nitrogen oxide emissions.

Various preferred exemplary embodiments of the invention are explained in more detail on the basis of the illustrations of FIGS. 2 to 5. Here, the injection processes ES of the internal combustion engine 10 are in each case indicated on the basis of the crankshaft angle ° CA.

A significant point of the method according to the invention is the division of the injected fuel into two parts, specifically a homogeneous pilot injection $M_H$ and a stratified main injection $M_S$. Initially, in the intake stroke of the internal combustion engine 10, a first fuel quantity is injected in a pilot injection $M_H$, so that a homogeneous air/fuel mixture with an air/fuel ratio of $\lambda>1$ is formed in the entire combustion chamber 18. In contrast to conventional homogeneous injections, a slightly lean mixture, preferably with an air/fuel ratio $\lambda$ of approximately 1.3, is formed in the combustion chamber 18 at high residual exhaust gas rates. In a relatively lean operating mode of the internal combustion engine, a considerably leaner mixture is formed as a function of the maximum obtainable excess of air amount.

Shortly before the ignition time ZT, which corresponds to the normal ignition time in a homogeneous operating mode of the internal combustion engine 10 and occurs between 0° CA and approximately 35° CA before ignition top dead center (ITDC), a second fuel quantity is injected, in the form of a stratified injection, into the combustion chamber 18 in a main injection $M_S$ directly before the ignition time ZT. Since the ignition time ZT can be influenced by the idle control, knock control or other control interventions, the injection time of the main injection $M_S$ must be coupled to the ignition time ZT. Said coupling is preferably carried out by means of a data-based spacing angle $\Delta$ between the end of the stratified main injection $M_S$ and the ignition time ZT. Said spacing angle $\Delta$ is preferably in a crank angle range of 2° CA to 10° CA before the ignition time ZT.

The purpose of the stratified main injection $M_S$ is to form a slightly rich ($\lambda<1$, for example $\lambda \approx 0.8$) charge cloud 30 in the vicinity of the spark plug 26 at the ignition time ZT, which is reliably combustible despite the high residual exhaust gas content in the combustion chamber 18. Highly reliable combustion is obtained by producing optimum conditions at the spark plug 26 at the ignition time ZT. The flame front can then progress from this region into those regions of the combustion chamber 18 in which the charge mixture is actually flammable but cannot be reliably ignited on account of the high residual exhaust gas rates.

In direct-injection gasoline engines with a jet-guided combustion method, the formation of the charge cloud 30 is dependent primarily on the jet formation and is therefore independent of the piston position and the gas flow within the combustion chamber. The design of the injection jet is dependent primarily on the shape of the injection nozzle 22 and the injection pressure.

Figure 2:
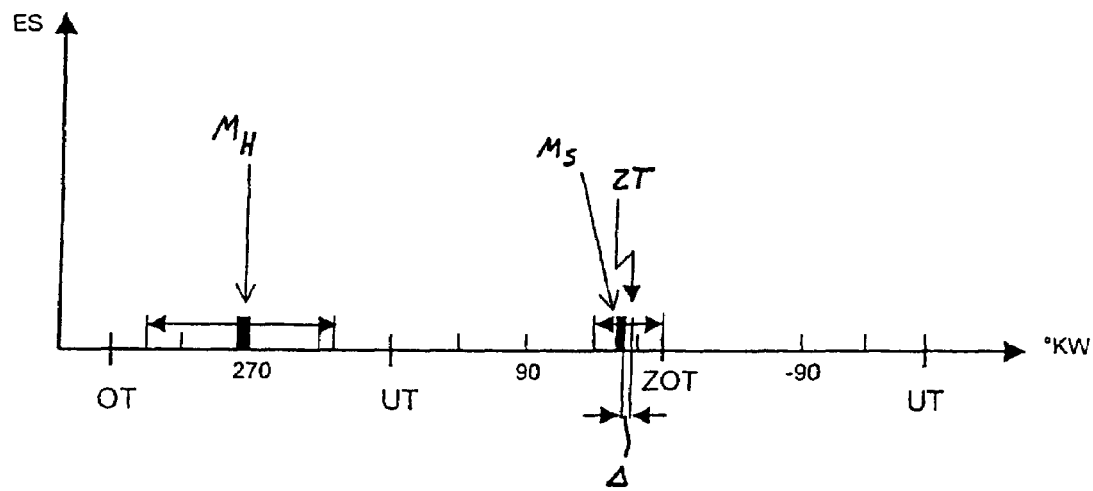
FIG. 2 shows in a schematic diagram a first exemplary embodiment of an injection profile of the internal combustion engine of FIG. 1, plotted against the crankshaft angle, according to the present invention.

As a result of the injection method according to the invention as illustrated in FIG. 2 and described above, on the one hand, a high excess of air is obtained in the combustion chamber by means of the homogeneous pilot injection $M_H$, leading to a reduction in nitrogen oxides despite a lean operating mode, and on the other hand, a reliably combustible charge cloud is provided in the region of the spark plug 26 by means of the stratified main injection $M_S$ at the injection time ZT, leading to a stable combustion and a reduction in the combustion temperature despite a high residual exhaust gas content in the combustion chamber 18. In this way, an operating mode of the internal combustion engine with a high residual exhaust gas content or a very lean charge mixture can be implemented in which the fuel savings are optimized and the nitrogen oxide emissions are simultaneously reduced.

In the case of a high residual exhaust gas content, the air/fuel mixture $\lambda$ after the stratified main injection $M_S$, averaged across the entire combustion chamber 18, is preferably stoichiometric ($\lambda \approx 1$). In a homogeneous lean operating mode of the internal combustion engine 10, said air/fuel ratio is, in contrast, lean.

Figure 3:
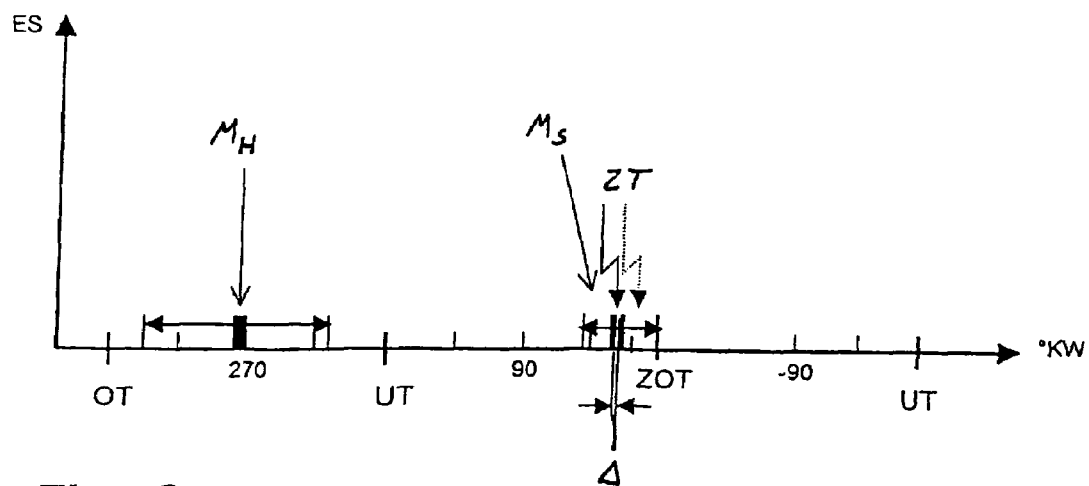
FIG. 3 shows schematically a second exemplary embodiment of an injection profile of the internal combustion engine of FIG. 1, plotted against the crankshaft angle, according to the present invention.

While, in the first exemplary embodiment of FIG. 2, the stratified main injection $M_S$ took place in the form of a single injection, in the second exemplary embodiment of FIG. 3, the stratified injection $M_S$ is carried out directly before the ignition time ZT as a double injection with a first stratified injection and a second stratified injection within a few milliseconds. As a result of the stratified main injection $M_S$ being carried out in a clocked fashion as a multiple injection, the mixture formation of the rich charge cloud 30 in the region of the spark plug 26, and therefore also the smooth running of the internal combustion engine 10, is further improved on account of better mixture of the fuel vapor with the fresh air. In addition, the multiple injection also further increases the degree of turbulence in the region of the spark plug 26, and therefore further stabilizes combustion.

As indicated in FIG. 3, the ignition time ZT in the case of a stratified double injection $M_S$ can either occur after the second stratified injection of the main injection $M_S$, or else between the first and the second stratified injection of the main injection $M_S$. Here, the injection time of the main injection $M_S$ is coupled to the ignition time ZT in such a way that the spacing angle $\Delta$ between the end of the first stratified injection of the main injection $M_S$ and the ignition time is preferably approximately 2° CA to approximately 10° CA, as a function of the operating point.

The remaining aspects of the second exemplary embodiment and the advantages which can be obtained with said method correspond to those of the first exemplary embodiment of FIG. 2.

Figure 4:
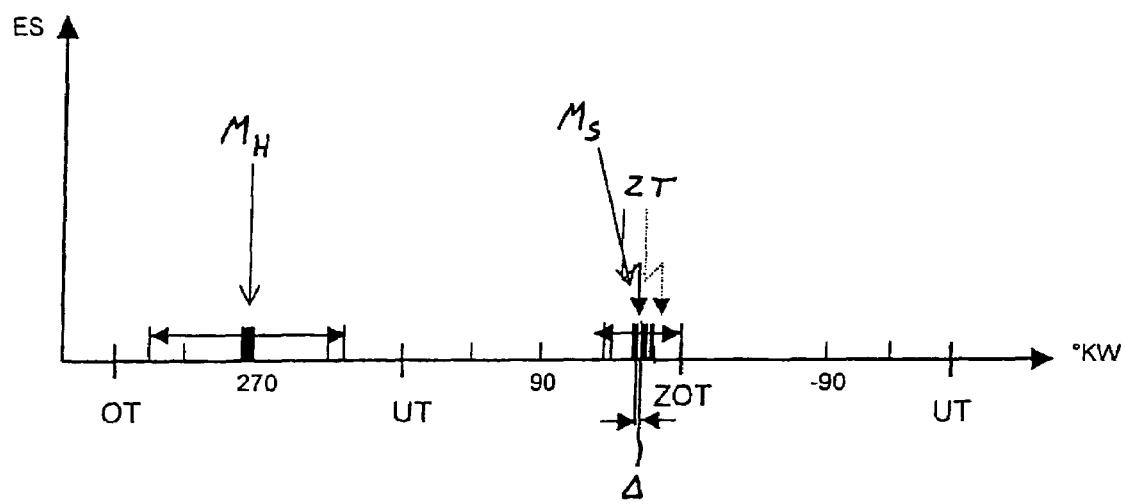
FIG. 4 shows schematically a third exemplary embodiment of an injection profile of the internal combustion engine of FIG. 1, plotted against the crankshaft angle, according to the present invention.

While, in the second exemplary embodiment, the main injection $M_S$ is carried out as a double injection with a first and a second stratified injection, the main injection $M_S$ in the third exemplary embodiment of FIG. 4 is carried out as a triple injection with a first, a second and a third stratified injection. The spacing angle $\Delta$ between the end of the first stratified injection and the ignition time ZT is also preferable approximately 2° CA to approximately 10° CA in this case.

As illustrated in FIG. 4, the ignition ZT can optionally occur between the first and the second or between the second and the third stratified injections of the stratified main injection $M_S$, or optionally after the third stratified injection of the main injection $M_S$.

Figure 5:
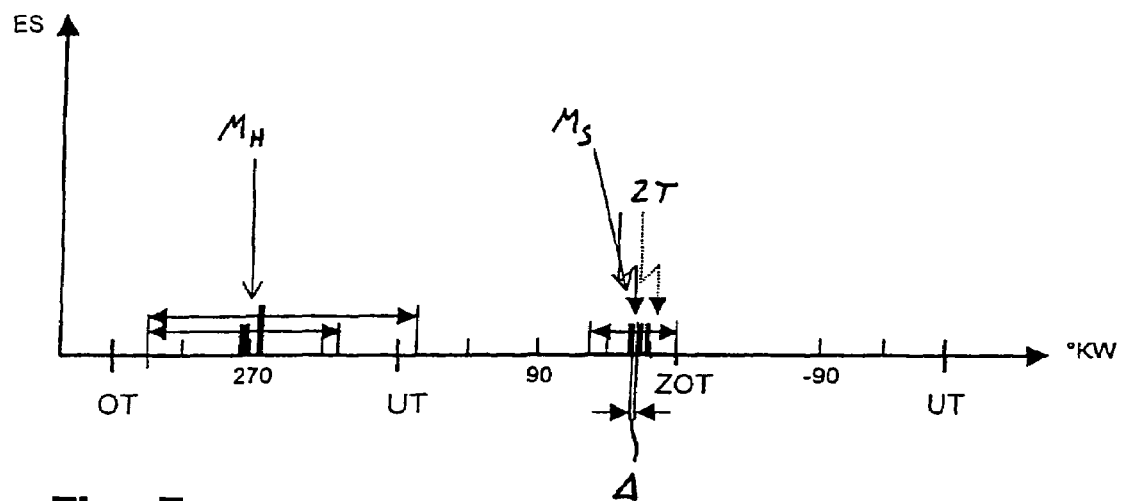
FIG. 5 shows schematically a fifth exemplary embodiment of an injection profile of the internal combustion engine of FIG. 1, plotted against the crankshaft angle, according to the present invention.

The fourth exemplary embodiment of the invention, as illustrated in FIG. 5, differs from the third exemplary embodiment in that the homogeneous pilot injection $M_H$ is also carried out as a multiple injection, as a double injection in the exemplary embodiment shown. Said homogeneous double injection further improves the homogeneity of the air/fuel mixture in the entire combustion chamber.

It is to be expressly pointed out at this stage that said homogeneous multiple injection $M_H$ of FIG. 5 can also be combined with all the other exemplary embodiments shown, without this being explicitly illustrated.

The present invention is particularly suitable for a spark ignition internal combustion engine with direct fuel injection. The advantages of the present invention are in particular the stabilization of the combustion at high residual exhaust gas rates in the combustion chamber as a result of external exhaust gas recirculation or internal exhaust gas retention obtained by means of suitable valve control times; the stabilization of the combustion during operation with a lean charge mixture; the fuel saving from the reduction of the charge exchange work as a result of dethrottling by means of external exhaust gas recirculation or internal exhaust gas retention; the fuel saving from a reduction of the charge exchange work as a result of dethrottling by means of lean operation of the internal combustion engine; and the reduction of the nitrogen oxide formation by means of the reduction in the combustion temperature resulting from the presence of increased inert gas quantities and/or resulting from combustion with an increased excess of air.

What is claimed is:

1. A method of operating a spark-ignition internal combustion engine (10) with direct fuel injection, comprising the steps of:

supplying a combustion chamber (18) with combustion air;

injecting, in a pilot injection, a first fuel quantity into the combustion chamber (18) during an intake stroke of the internal combustion engine (10) so as to form with said pilot injection ($M_H$) a homogeneous, lean air/fuel mixture ($\lambda > 1$) in substantially the entire combustion chamber (18);

injecting subsequently, in a main injection ($M_S$), a second fuel quantity in into the combustion chamber (18) directly before the ignition time (ZT) such that said main injection ($M_S$) forms a stratified, rich air/fuel mixture ($\lambda < 1$) in the region of the spark plug (26), and igniting the air/fuel mixture by means of a spark plug (26) at a predetermined ignition time (ZT), said main injection ($M_S$) being carried out as a multiple injection with a plurality of stratified injections in rapid succession, the end of the first stratified injection of the main injection ($M_S$) occurring at approximately 2° CA to 10° CA before the ignition time (ZT).

2. The method as claimed in claim 1, wherein the main injection ($M_S$) is carried out as a double injection with two stratified injections, and the ignition time (ZT) occurs at one of the points in time; after the second stratified injection of the main injection and between the first and second stratified injections of the main injection.

3. The method as claimed in claim 1, wherein the main injection ($M_S$) is carried out as a triple injection with three stratified injections, and the ignition time (ZT) occurs one of the points in time; after the third-stratified injection of the main injection and between the first and second, or between the second and third, stratified injections of the main injection.

4. The method as claimed in claim 1, wherein, in the case of operation with high residual exhaust gas rates, the pilot injection ($M_H$) generates a slightly lean air/fuel mixture of $\lambda \approx 1.3$, in the combustion chamber (18).

5. The method as claimed in claim 1, wherein, averaged across the entire combustion chamber (18), the air/fuel mixture after the second, stratified injection ($M_S$) is approximately stoichiometric ($\lambda \approx 1$).

6. The method as claimed in claim 1, wherein the ignition time (ZT) occurs between 0° CA and approximately 35° CA before top dead center (ITDC).

7. The method as claimed in claim 1, wherein also the pilot injection ($M_H$) is carried out as a multiple injection with a plurality of homogeneous individual injections.

* * * * *